United States Patent [19]

Ali

[11] 4,081,264

[45] Mar. 28, 1978

[54] SLOW RELEASE FERTILIZERS AND PROCESSES FOR PREPARING SAME

[75] Inventor: Wahid R. Ali, Pointe-a-Pierre, Trinidad and Tobago

[73] Assignee: Texaco Trinidad Inc., Pointe-a-Pierre, Trinidad and Tobago

[21] Appl. No.: 728,322

[22] Filed: Sep. 30, 1976

[51] Int. Cl.² .............................................. C05C 9/00
[52] U.S. Cl. ............................................ 71/28; 71/34; 71/63; 71/64 E; 71/64 F; 427/212
[58] Field of Search ................ 71/1, 27, 28, 63, 64 A, 71/64 R, 64 C, 64 E, 64 F, 33, 34; 427/212

[56] References Cited

U.S. PATENT DOCUMENTS

| 3,206,297 | 9/1965 | O'Connor | 71/28 |
| 3,276,857 | 10/1966 | Stansbury et al. | 71/64 E |
| 3,295,950 | 1/1967 | Blouin et al. | 71/64 F |
| 3,576,613 | 4/1971 | Fleming | 71/64 F |
| 3,903,333 | 9/1975 | Shirley, Jr. et al. | 71/64 F |

FOREIGN PATENT DOCUMENTS

| 2,204,552 | 1/1973 | France | 71/28 |
| 7,204,967 | 12/1972 | Japan | 71/64 F |

*Primary Examiner*—Charles N. Hart
*Assistant Examiner*—Ferris H. Lander
*Attorney, Agent, or Firm*—Thomas H. Whaley; Carl G. Ries; Henry W. Archer

[57] ABSTRACT

Described are encapsulated slow release fertilizers prepared by providing a fertilizer substrate, spraying molten sulfur thereon; encapsulating the sulfur-coated fertilizer by solvent deposition of bitumen and then powder coating the bitumen- and sulfur-coated fertilizer with a finely ground, dry, mineral powder which reduces the tackiness of the combined coating.

4 Claims, No Drawings

SLOW RELEASE FERTILIZERS AND PROCESSES FOR PREPARING SAME

BACKGROUND OF THE INVENTION

1. Field of the Invention

This invention is concerned with slow release fertilizers and to processes for preparing same by encapsulating a sulfur-coated fertilizer with bitumen.

The rate of dissolution of fertilizers in the soil greatly exceeds the rate at which they are assimilated. Once they have dissolved, they are easily washed away by rain, resulting in considerable wastage. One way of reducing this wastage is to coat the fertilizer granules with a hydrophobic material. Encapsulation has now become a recognized way of making slow release fertilizers.

2. Description of the Prior Art

Encapsulated or coated fertilizers have been the subject of much research and a great many coating materials and methods have been patented in, for example, U.S. Pat. Nos: 3,223,518; 3,142,558; 3,248,255; 3,285,733; 3,190,741; 3,129,091; 3,220,824; 3,264,089; 3,119,683; 3,192,030; 3,198,761; 3,192,031 and 3,192,032.

As shown by these patents, various materials can be used for coating or encapsulating fertilizers. These include sulphur, paraffin wax, synthetic and natural resins, copolymers, bitumen and polyolefins. Sulphur has the advantage of providing additional nutritional benefits to the plants. Several techniques can be used for coating the fertilizers granules. The best technique appears to be spraying and, for this, special rotating drums have been built. Spraying of a molten material has the advantage, that when the film cools and so contracts, a tight skin is formed on the fertilizer granules which is more water-resistant. Powder coating has also been used. In this case the fertilizer to be coated is first heated to soften its surface without melting and is then contacted with a powdered coating agent.

SUMMARY OF THE INVENTION

In their composition aspect, the slow release fertilizers of the invention comprise a coarse fertilizer substrate encapsulated with coatings of sulfur and bitumen as sequential encapsulating agents and an outer coating of a free flowing smooth inorganic material.

In the compositions of the invention, the fertilizer particles preferably have a diameter ranging from about 2.5 to about 4.5 mm. The compositions comprise from 60 to 85 weight percent of fertilizer; 10 to 33 weight percent of sulfur; from 4 to 15 weight percent of bitumen; and from 1 to 5 weight percent of a finely divided, free-flowing mineral such as limestone, chalk, talc, silica and the like.

In its process aspect, the invention resides in a sequence of steps including providing a finely divided fertilizer substrate, spraying the substrate with molten sulfur heated to a temperature in the range of 150° to 170° Centigrade; agitating the sulfur-coated fertilizer particles, solution coating the particles with a bitumen solution in a solvent; evaporating the solvent, and spraying the resulting product with a finely divided smooth mineral to give a free flowing product.

Many fertilizer substrates may be coated by the processes of the invention. These include urea, potassium chloride, diammonium phosphate, ammonium phosphate, ammonium polyphosphate and mixtures thereof. In the examples reported hereunder, urea is used as the fertilizer. This selection is made because urea is widely used, and being very soluble, there is a great need to increase its resistance to leaching. The slow release fertilizers are evaluated in terms of their resistance to leaching, or elutriation, by water. The evaluation procedure consists of immersing a known weight of the slow release fertilizers in a specified volume of water at 100° F for a prolonged period. Samples of the supernatant liquid are withdrawn periodically and analyzed. The lower the rate of fertilizer dissolution, the better is the product.

Experimental work has shown sulfur alone to be incapable of providing a very good seal for the surface of the fertilizer granule. It was found that the surface would contain "pinholes" or other imperfections which would permit dissolution. Further, as sulphur is brittle, the coating is more susceptible to damage. A second coating is therefore required, using another material preferably one with plasticising properties. Suitable materials are bitumen, slack wax, polybutene, synthetic or natural resins, etc., but bitumen is the most effective. The effect of using a second coating is illustrated below:

| Composition | Sulphur Coated Urea (SCU) | Bitumen Coated Urea | Bitumen Coated SCU |
|---|---|---|---|
| Urea, g. | 75 | 80 | 75 |
| Sulphur, g. | 25 | — | 15 |
| Bitumen, g. | — | 20 | 10 |
| Product Dissolution at 100° F., % | | | |
| After 1 day | 63 | 35 | 5 |
| After 2 days | 77 | 51 | 9 |
| After 3 days | — | 81 | 16 |
| After 4 days | 88 | — | — |
| Final Sample | 100 | 100 | 100 |

It may be seen from the results that the second coating makes a very significant improvement on the hydrolytic stability of the product.

EFFECT OF RATIO OF SULPHUR TO SURFACE AREA OF FERTILIZER

As the ratio of the quantity of coating agent to the surface area of the fertilizer increases, the resistance to leaching also increases. There are two ways in which this ratio may be increased. In the first method, the relative amount of sulphur is increased. As shown below, the higher sulphur content results in a superior product.

| Sulphur Content, wt. % (balance fertilizer) | 33 | 25 |
|---|---|---|
| Product Dissolution at $\phi°$ F (Percent) | | |
| After 24 hours | 50 | 47 |
| After 48 hours | 55 | 67 |
| After 72 hours | 57 | 89 |
| After 96 hours | 77 | 97 |

A suitable proportion of sulphur to fertilizer is 10 to 33 weight percent of sulfur.

In the second method, the amount of urea used is constant but the particle size is varied. The results are shown below:

| Particle Size of Urea Granules, dia. mm. | 1.3[a] | 3.8[a] |
|---|---|---|
| Product Dissolution at 100° F. | | |
| After 24 hours | 91 | 65 |

| -continued | | |
|---|---|---|
| After 48 hours | 95 | 78 |
| After 72 hours | 96 | 83 |
| After 96 hours | 99 | 84 |

(a)Ratio of sulphur to urea was constant.

It may be seen that for a given ratio of sulphur to urea, more water-resistant products are obtained with the larger urea granules. This result is to be expected since, for a given amount of urea, the larger particles would possess a smaller surface area; in this way, a given amount of sulphur would form a thicker coat and result in a more stable product. A suitable particle range for the fertilizer is 2.5–4.5 mm diameter.

SPRAYING CONDITIONS

The effect of different spraying temperatures was studied within the range of 125°–170° C (because of its physical properties, the spraying of sulphur becomes very difficult outside this range). The results are shown below:

| Temp. of Sulphur, °C. | 125 | 135 | 145 | 150 | 160 | 165 | 170 |
|---|---|---|---|---|---|---|---|
| Product(a) Dissolution at 100° F | | | | | | | |
| After 24 hours | — | 95 | 85 | 88 | 82 | 65 | 65 |
| After 48 hours | 91 | 95 | 95 | 74 | 87 | 78 | 82 |
| After 72 hours | 97 | 82 | — | 83 | 87 | 83 | 87 |
| After 96 hours | — | — | — | 87 | 91 | 84 | 87 |

(a)Size of Urea Granules - 3.8 mm.

It may be seen that the optimum spraying temperature is around 165° C.

A suitable device for spraying the sulphur consists of two narrow concentric tubes with tapered ends. Molten sulphur flows through the inner tube and is sprayed by hot air from the outer tube. The relative sizes of these tubes can affect the fineness of the sulphur spray. It was found that sulphur coated urea in which the finer spray was obtained, resulted in a more water-resistant product. A spray jet of 0.01 to 0.005 cm. is preferred.

BITUMEN APPLICATION

Although the sulphur is best applied by spraying in a molten form, the subsequent coating of bitumen cannot be so applied. This is because of the tackiness of the mixture; it was found that spraying of the bitumen onto an agitated mixture of sulphur-coated urea results in an agglomerated mass which prevents the sulphur surface from being uniformly coated with bitumen. Proper application of bitumen is achieved by solution coating. The sulphur coated urea is placed in a rotary evaporator and a solution containing the calculated quantity of bitumen in an inert solvent such as hexane or petroleum ether is then added. The rotary evaporator is switched on and the hexane solvent is distilled to dryness. In this way a uniform coating is obtained.

The product is now tacky and requires spraying with a suitable powder to become free flowing. Finely ground limestone, chalk, talk, silica, etc., are all suitable materials providing their particle size is sufficiently small, around 300 mesh. Limestone is preferable by virtue of its low cost.

While the proportions of constituents given in the foregoing description give oustanding release characteristics with the given fertilizer, it will be appreciated that by following the teachings of the invention those skilled in the art will be able without undue experimentation to determine optimum composition ranges for other fertilizers.

It is to be understood that the foregoing specific examples are presented by way of illustration and explanation only and that the invention is not limited by the details of such examples.

The foregoing is believed to so disclose the present invention that those skilled in the art to which it appertains can, by applying thereto current knowledge, readily modify it for various applications. Therefore, such modifications are intended to fall within the range of equivalence of the appended claims.

What is claimed is:

1. A process for preparing a slow release fertilizer comprising providing a substrate of coarsely divided fertilizer particles of a diameter ranging from about 2.5 to 4.5 mm, spraying a first coating of molten sulfur at a temperature of 125 to 170° C as a jet of .005 to 0.1 inches in diameter onto said particles; solution coating said sulphur-coated particles with a solution of bitumen in a low boiling inert solvent; removing said solvent by distillation and spraying the remaining particles with a mineral powder to produce free flowing particles of fertilizer encapsulated in sulfur and bitumen.

2. The process of claim 1, wherein said mineral powder of limestone, chalk, talc and silica.

3. A slow release fertilizer composition comprising, in combination, from 60 to 85 weight percent of a substrate consisting of coarse fertilizer particles encapsulated by a first coating consisting of 10 to 33 weight percent of sulfur, a second coating thereover consisting of 4 to 15 weight percent of bitumen and an external coating consisting of about 1 to about 5 weight percent of a finely ground mineral of the group of limestone, chalk, talk and silica.

4. The composition of claim 3, wherein said fertilizer particles have a diameter ranging from about 2.5 to 4.5 mm.